(12) United States Patent
Hoffmann

(10) Patent No.: US 10,623,201 B2
(45) Date of Patent: Apr. 14, 2020

(54) DEVICE FOR COUPLING TWO BUS SYSTEMS

(71) Applicant: Phoenix Contact GmbH & Co. KG, Blomberg (DE)

(72) Inventor: Michael Hoffmann, Lemgo (DE)

(73) Assignee: Phoenix Contact GmbH & Co. KG, Blomberg (DE)

(*) Notice: Subject to any disclaimer, the term of this patent is extended or adjusted under 35 U.S.C. 154(b) by 0 days.

(21) Appl. No.: 15/780,797

(22) PCT Filed: Dec. 2, 2016

(86) PCT No.: PCT/EP2016/079650
§ 371 (c)(1),
(2) Date: Jun. 1, 2018

(87) PCT Pub. No.: WO2017/093521
PCT Pub. Date: Jun. 8, 2017

(65) Prior Publication Data
US 2018/0367334 A1 Dec. 20, 2018

(30) Foreign Application Priority Data
Dec. 3, 2015 (DE) .................. 10 2015 121 104

(51) Int. Cl.
*G05B 19/418* (2006.01)
*H04L 12/40* (2006.01)
*H04L 12/02* (2006.01)

(52) U.S. Cl.
CPC ...... *H04L 12/40143* (2013.01); *G05B 19/418* (2013.01); *H04L 12/02* (2013.01); *G05B 19/4185* (2013.01); *H04L 2012/4026* (2013.01)

(58) Field of Classification Search
CPC ............. H04L 12/40143; H04L 12/02; H04L 2012/402; G05B 19/418; G05B 19/4185
See application file for complete search history.

(56) References Cited

U.S. PATENT DOCUMENTS 6,192,281 B1 * 2/2001 Brown .............. G05B 19/0425
700/2
8,554,978 B2 * 10/2013 Buesching .......... G06F 13/4054
710/311

(Continued)

FOREIGN PATENT DOCUMENTS

DE 102004007746 A1 9/2005
DE 102005048581 A1 4/2007

(Continued)

OTHER PUBLICATIONS

Officer: M. Messelken, International Search Report and the Written Opinion, PCT/EP2016/079652, dated Mar 16, 2017, 12 pp.

*Primary Examiner* — Mohamed A Kamara
(74) *Attorney, Agent, or Firm* — Kaplan Breyer Schwarz, LLP

(57) ABSTRACT

A coupling device that couples a first bus system to a second bus system configured to provide bidirectional communication between the first bus system and the second bus system comprising data transfer means for transmitting forward-directed data from the first bus system to the second bus system and for transmitting backward-directed data from the second bus system to the first bus system, data manipulation means for manipulating forward-directed data and/or backward-directed, and an instruction memory for storing manipulation instructions relating to the manipulation of data by the data manipulation means.

15 Claims, 3 Drawing Sheets

(56) References Cited

U.S. PATENT DOCUMENTS

| | | | |
|---|---|---|---|
| 2006/0047480 A1 | 3/2006 | Lenz et al. | |
| 2007/0142934 A1* | 6/2007 | Boercsoek | G05B 19/4185 |
| | | | 700/23 |
| 2010/0211711 A1* | 8/2010 | Kuschke | G05B 19/042 |
| | | | 710/110 |
| 2012/0254377 A1* | 10/2012 | Bernhard | H04L 12/40195 |
| | | | 709/220 |

FOREIGN PATENT DOCUMENTS

| | | |
|---|---|---|
| DE | 102010020446 A1 | 11/2011 |
| DE | 102008019277 B4 | 7/2013 |

* cited by examiner

Fig. 3

| 46 | | 44 | | | 48 | |
|---|---|---|---|---|---|---|
| Data 1 Device 1 | 0x0 | 0 | 0x0 | 0x0 | Data 1 Device 1 | 1 |
| Data 2 Device 1 | 0x1 | 1 | 0x1 | 0x1 | Data' 2 Device 1 | 2 |
| Data 1 Device 2 | 0x2 | 0 | 0x6 | 0x2 | Data 3 Device 1 | 3 |
| Data 2 Device 2 | 0x3 | 0 | 0x7 | 0x3 | Data 4 Device 1 | 4 |
| Data 1 Device 3 | 0x4 | 0 | 0x2 | 0x4 | Data 1 Device 2 | 5 |
| Data 2 Device 3 | 0x5 | 1 | 0x3 | 0x5 | Data' 2 Device 2 | 6 |
| Data 3 Device 1 | 0x6 | 0 | 0x8 | 0x6 | Data 3 Device 2 | 7 |
| Data 4 Device 1 | 0x7 | 0 | 0x9 | 0x7 | Data 4 Device 2 | 8 |
| Data 3 Device 2 | 0x8 | 0 | 0x4 | 0x8 | Data 1 Device 3 | 9 |
| Data 4 Device 2 | 0x9 | 1 | 0x5 | 0x9 | Data' 2 Device 3 | 10 |
| Data 3 Device 3 | 0xA | 0 | 0xA | 0xA | Data 3 Device 3 | 11 |
| Data 4 Device 3 | 0xB | 0 | 0xB | 0xB | Data 4 Device 3 | 12 |
| Data 5 Device 3 | 0xC | 0 | 0xC | 0xC | Data 5 Device 3 | 13 |
| Data 6 Device 3 | 0xD | 0 | 0xD | 0xD | Data 6 Device 3 | 14 |
| Data 7 Device 3 | 0xE | 0 | 0xE | 0xE | Data 7 Device 3 | 15 |
| Data 8 Device 3 | 0xF | 0 | 0xF | 0xF | Data 8 Device 3 | 16 |

58  56   54  52  50   62  60

DEVICE FOR COUPLING TWO BUS SYSTEMS

FIELD

The present invention relates to the field of coupling two bus systems.

BACKGROUND

In modern communication and control systems, different fieldbus systems can be used for data transmission or for control purposes, which often have to be coupled to each other, and in this case a distinction can be made between a higher-level bus system and a lower-level bus system. The higher-level bus system is the bus system that is connected to a control system. The lower-level bus system, on the other hand, is the bus system that has to be coupled to the higher-level bus system. In this context, the problem arises of transferring or transmitting data from one bus system to the other bus system without time loss as far as possible. Moreover, portions of the data such as header information typically have to be altered according to predefined rules in order to ensure compatibility of the data of one bus system for the respective other bus system. The rules for altering the data are often processed by a permanently installed software, sometimes also by a hardwired hardware, to provide for particularly efficient data transfer. However, this leads to limited flexibility in data processing.

DE 10 2010 020 446 B4 discloses an automation appliance having means for converting the data packets coming from a fieldbus into a data stream for a local bus and for converting the data stream directed from the local bus to the automation appliance into data packets for the fieldbus. The automation appliance has an acceleration unit for selecting process data that are to be converted in accelerated fashion and for separately converting the selected process data, which is configured such that the selected process data are output at an earlier time than non-selected process data which are transmitted as well in combination with the selected process data. For this purpose, the automation appliance is configured in conventional manner for processing the non-selected process data using software on a microcontroller, while the selected process data are processed by hardware logic. In the latter case, data processing is carried out according to fixed predefined rules.

DE 10 2008 019 277 B4, which is hereby incorporated by reference as an intellectual property right of the same applicant as of the present patent application, discloses a data transmission device for transmitting data between a first bus system and a second bus system without using a processor after initialization of respective memories, comprising a copy table for providing a rearranged output sequence of data of the first bus system, and a hard-wired or hard-coded transmission device for transmitting the data between the first bus system and the second bus system according to the rearranged output sequence. Although data processing is particularly efficient with this hardware-based transmission concept, it can still be enhanced in terms of flexibility.

The object of the present invention is to provide an efficient and at the same time flexible and modular concept for modifying data when coupling two bus systems.

This object is achieved by the subject-matter of the independent claims. Advantageous embodiments are specified by the dependent claims.

According to the invention, a device is provided for coupling a first bus system to a second bus system, which is configured to provide for bidirectional communication between the first bus system and the second bus system.

The coupling device comprises data transfer means for transmitting data from the first bus system to the second bus system, which will be referred to as forward-directed data below, and for transmitting data from the second bus system to the first bus system, which will be referred to as backward-directed data below.

Furthermore, the coupling device comprises data manipulation means for manipulating forward-directed data and/or backward-directed data, and an instruction memory for storing manipulation instructions relating to the manipulation of data by the data manipulation means.

The data transfer means and the data manipulation means may be included in a hardware unit.

It is now intended that the manipulation instructions can be reloaded into the instruction memory in a modular manner, for instance by a user of the device. This provides for a particularly high degree of flexibility with regard to the manipulation of the data.

For example, the manipulation instructions may be preset by the factory, and may be modifiable by the user. For example, an update mechanism may be provided. Also, provisions may be made so that at least portions of the manipulation instructions are replaceable at a later time. For example, it may be possible for a user to reload flexible program code. It may be possible to flexibly reload apps (applications).

Thus, a possibility is for instance created for loading, into the coupling device, applications for data processing as reloadable functions, so-called apps. Functions that can be implemented, for example, include counter functions, reflex functions (different input states lead to a specific output state), time stamping or oversampling of process data with data from standard fieldbus modules, event evaluation, control functions, etc.

The flexible reloading can be made possible through an interface that is dedicated for this purpose, for example.

The bus coupler may for instance comprise a hardware unit that allows to load flexible program code into the hardware unit, which can then be executed. The hardware unit preferably has access to (process) data and is capable of selectively manipulating or extending them. In this way, it is possible to advantageously implement various functions which can be reloaded in the form of program code without interfering with the other operation of the bus coupler.

The processed (process) data may, for example, be transmitted to the higher-level fieldbus as new data, e.g. as a new module, or may else be output directly to a connected field bus subscriber.

For example, (process) data exchange may always take place in special hardware components that do not influence the response times of the (process) data exchanger. The bus coupler is thus capable of processing (process) data without disturbing or slowing down the normal (process) data exchange or affecting the response times of the bus coupler.

For example, provisions may be made for using hardware components which ensure that the data flow does not depend on processors. It is also conceivable that the coupling device, in particular the hardware unit, comprises a dedicated processor which is responsible for the execution of reloaded manipulation instructions.

In this manner, it is avoided that (process) data are processed by the or an already existing processor which already has to process the handling of the usual tasks in a bus coupler and therefore would not always be able to process the new tasks quickly and without delay.

In principle, it is also possible to reload the functions or apps into specific FPGA designs (FPGA: Field Programmable Gate Array, i.e. (logic) gate arrays that are programmable in the field, i.e. on site at the customer), which will then provide the additional functions. Different functional designs can be offered in the FPGA for this purpose, which can then be loaded into the bus coupler via an update mechanism. Each FPGA design may provide special functions.

On the other hand, however, the variant which allows to load flexible program code into the bus coupler is more universal.

According to one embodiment of the invention, the coupling device comprises instruction execution means for executing the manipulation instructions and generating manipulation data, and a manipulation data buffer for buffering generated manipulation data for the data manipulation means.

The instruction execution means and/or the manipulation data buffer may be included in the hardware unit. The instruction execution means may, for example, be implemented as an FPGA and/or as a processor. The instruction execution means may be provided exclusively for executing the manipulation instructions.

Furthermore, in this embodiment, the data manipulation means is adapted to link the manipulation data buffered in the manipulation data buffer with forward-directed and/or backward-directed data, to overwrite at least portions of forward-directed and/or backward-directed data with manipulation data. It is, for example, also possible for manipulation data to be prepended or appended to the data.

According to one embodiment of the invention, the manipulation instructions relate to forward-directed and/or backward-directed data. Accordingly, in this embodiment, the instruction execution means is adapted to access the relevant forward-directed and/or backward-directed data to execute the related manipulation instructions.

It may be contemplated that the manipulation instructions relate to current data from the last cycle of the higher-level bus system, for example.

However, it may furthermore be contemplated, for example, that the manipulation instructions relate to forward-directed and/or backward-directed data from a previous point in time, e.g. data from a previous bus cycle. This can be enabled, for example, by placing data in a multiple (e.g. triple) swap buffer.

According to one embodiment of the invention, the coupling device comprises an output data buffer associated with the first bus system for buffering forward-directed data, and an input data buffer associated with the first bus system for buffering backward-directed data. The two buffers are directly linked with the higher-level bus and capable of buffering process data, for example.

Furthermore, in this embodiment, the data transfer means and/or the data manipulation means are configured to access the output buffer and/or the input buffer to transmit or manipulate forward-directed and/or backward-directed data.

The output data buffer and/or the input data buffer may be included in the hardware unit.

SUMMARY

According to one embodiment of the invention, the instruction execution means is adapted to access the output buffer and/or the input buffer in order to execute manipulation instructions relating to forward-directed data or in order to feed manipulation data into the input buffer.

Accordingly, it may be contemplated, for example, to write manipulation data for forward-directed data that are to be modified at a later time into the manipulation data buffer, and/or to write output data of the instruction execution means into the input buffer of the first bus system, as backward-directed data.

According to one embodiment of the invention, the data manipulation means is adapted to link manipulation data with forward-directed or backward-directed data in such a manner that these manipulation data are initially transferred by the second or first bus system without being processed, and at a later point in time return as manipulated backward-directed or forward-directed data for the first or second bus system, respectively.

Accordingly, it may as well be contemplated, for example, that the data manipulation means is adapted for manipulating data only in one direction, but the manipulation data relate to both the first and second bus systems. For example, the data manipulation means may be adapted for manipulating data only in the forward direction. Then, data for the reverse direction may be generated by the data manipulation means by transmitting more data in the lower-level bus system than data being processed on the bus, for example.

According to one embodiment of the invention, the coupling device comprises a copy table for providing a rearranging sequence for forward-directed and/or backward-directed data.

The copy table may be included in the hardware unit.

According to one embodiment of the invention, the transfer means is adapted to rearrange forward-directed data from the output data buffer, according to the rearranging sequence, and to transmit them to the second bus system. The transmission to the second bus system may be accomplished without intermediate buffering, for example.

According to one embodiment of the invention, the transfer means is adapted to rearrange backward-directed data according to the rearranging sequence and to transmit them to the first bus system to the input data buffer.

According to one embodiment of the invention, the copy table comprises extended information comprising an extended bit which indicates whether a respective data item is to be manipulated by the data manipulation means.

According to one embodiment of the invention, the coupling device comprises an instruction execution buffer for buffering data to be manipulated according to an extended bit.

The instruction execution buffer may be included in the hardware unit.

According to one embodiment of the invention, the instruction execution means is adapted to access the instruction execution buffer.

According to one embodiment of the invention, the instruction execution means processes the copy table after a cycle of the first and/or second bus system has been completed.

According to one embodiment of the invention, the coupling device comprises a mask buffer for storing a bit mask which indicates which portions of forward-directed and/or backward-directed data are to be manipulated by the data manipulation means.

The mask buffer may be included in the hardware unit.

According to one embodiment of the invention, the coupling device comprises a processor which is adapted to initialize the instruction memory with the manipulation instructions, and/or to initialize the copy table with the rearranging sequence and with extended information if the copy table comprises extended information.

The invention furthermore relates to a method for coupling a first bus system to a second bus system to provide for bidirectional communication between the first bus system and the second bus system.

The method according to the invention comprises the following steps: (a) reloading manipulation instructions into an instruction memory; (b) storing the manipulation instructions in the instruction memory; (c) transferring data between the first and second bus systems, by data transfer means; and (d) manipulating data according to the manipulation instructions, by data manipulation means.

The invention furthermore relates to a device equipped with a program, comprising a computer program for carrying out the method of the invention.

Finally, the invention relates to a computer program for carrying out the method of the invention when the computer program is executed on a computer.

BRIEF DESCRIPTION OF THE DRAWINGS

Further exemplary embodiments of the invention will be explained in more detail with reference to the accompanying drawings, wherein:

FIG. 3 shows a first and a second sequence of data and an associated copy table.

DETAILED DESCRIPTION

Figure 1:
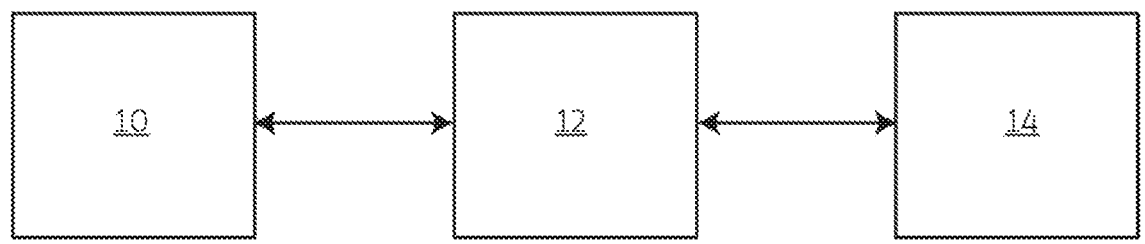
FIG. 1 is a highly schematic view showing a device for coupling two bus systems.
Figure 2:
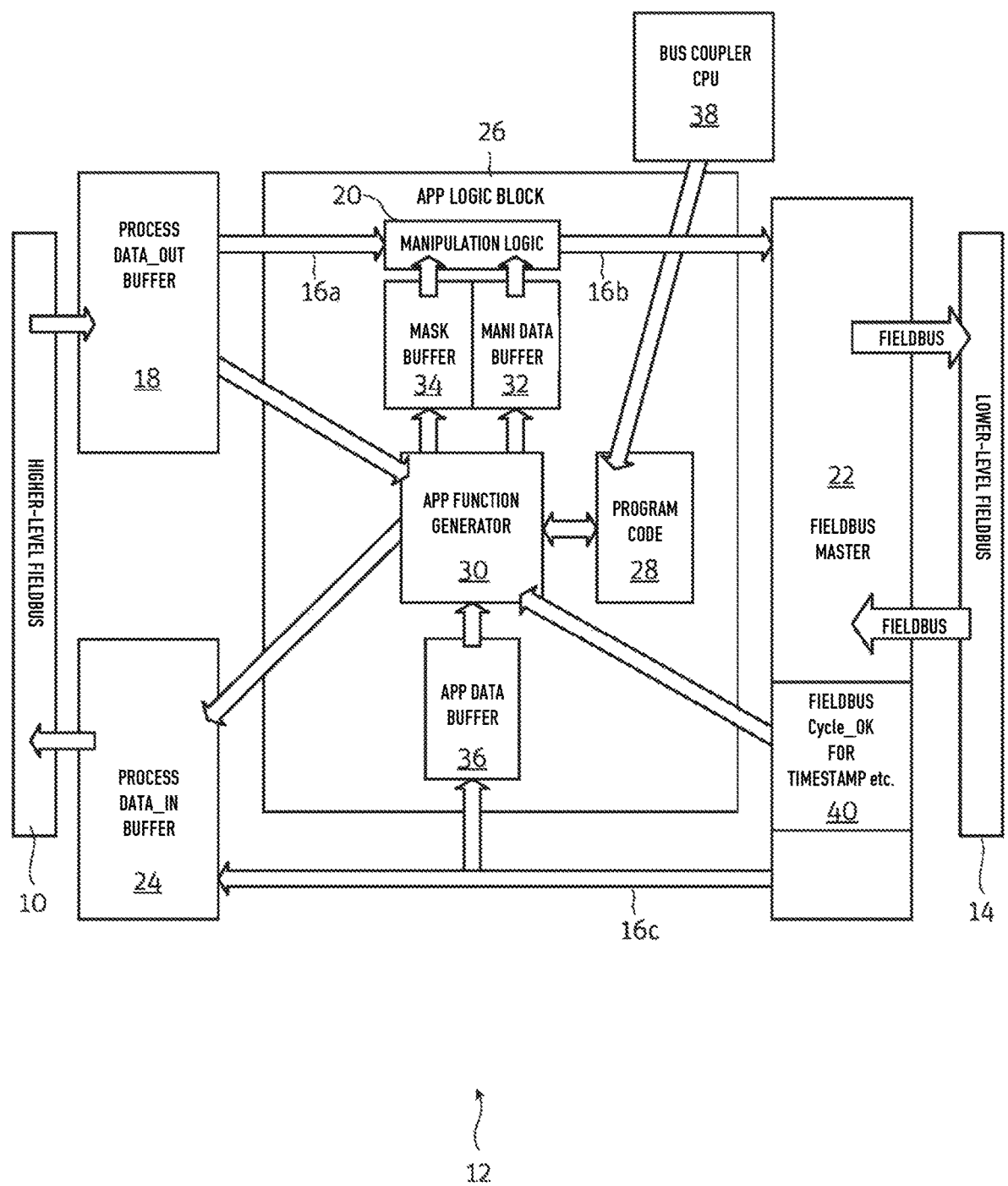
FIG. 2 shows an exemplary embodiment of a device along with a greatly simplified processing scheme for coupling two bus systems.

Referring to FIGS. 1 and 2, the coupling device 12 links a first bus system 10 and a second bus system 14, whereby the coupling device 12 provides for bidirectional communication.

Coupling device 12 as illustrated in FIG. 2 comprises data transfer means comprising transfer channels 16a, 16b, and 16c. Transfer channel 16a provides for data transmission from an output data buffer 18 of the first higher-level bus system 10, in particular a field bus, to a data manipulation means 20. Transfer channel 16b provides for data transmission to fieldbus master 22 of the second lower-level bus system 14. The data transmission via channels 16a and 16b from higher-level bus 10 to lower-level bus 14 can be defined as a forward direction, for example, then the data transmitted along these channels are so-called forward-directed data. Thus, according to FIG. 2, the coupling device 12 serving as a bus coupler is furthermore configured as a fieldbus coupler.

Backward-directed data then correspond to data from the lower-level bus 14 to the higher-level bus 10 and are routed via transfer channel 16c. The backward-directed data may first be fed into an input data buffer 24 of the higher-level bus system 10, for example. From there, the data reach the higher-level fieldbus 10.

According to the example of FIG. 2, the data manipulation means 20 and the data transfer means with channels 16a, 16b, and 16c are included in a hardware unit 26 which is referred to as "APP logic block" in the figure. Hardware unit 26 furthermore comprises an instruction memory 28, instruction execution means 30, a manipulation data buffer 32 which may be implemented as a swap buffer, a mask buffer 34, and an instruction execution buffer 36.

Within the context of the invention, coupling device 12 is distinguished by reloadable module functions for processing process data or reloading apps into the coupling device 12. Thus, preferably, manipulation instructions can be reloaded in modular manner into the instruction memory 28, by a user.

An initialization phase may for instance be implemented as follows: The processor 38 of coupling device 12 loads manipulation instructions into the instruction memory 28, for example in the form of program code. Instruction execution means 30 fills the mask buffer 34 according to the instructions from the program code. Furthermore, copy tables 44 (see FIG. 3) with extended bit 54 are configured by the bus coupler CPU 38.

A cyclic data phase following the initialization phase, may for instance proceed as follows:

(a) A fieldbus cycle is received and stored into the input data buffer 24 of the higher-level bus system 10. Simultaneously with the data of the input data buffer 24, the (process) data corresponding to the extended bits 54 that are set in the copy table 44 are stored into the instruction execution buffer 36.

(b) When the signal "Fieldbus Cycle OK" is set, e.g. in a memory 40, the instruction execution means 30 will start to generate the programmed functions from the data of the instruction execution buffer 36, optionally also from the output data buffer 18, and to write the data into the manipulation data buffer 32 and/or the input data buffer 24.

(c) Once the generation is completed, the cycle is terminated and a new fieldbus cycle can be started.

(d) A fieldbus cycle is started, and the address of mask buffer 34 and of manipulation data buffer 32 is set to start. The extended bits 54 are read out from the copy table 44 in order to derive (process) data from the output data buffer 18. If the extended bit 54 is not set, the data are forwarded to the fieldbus master 22 in unchanged form, by the data manipulation means 20, i.e. the data are transferred unchanged from the first bus 10 to the second bus 14 via channels 16a and 16b. If the extended bit is set, the bits from output data buffer 18 are modified in data manipulation means 20. The contents of mask buffer 34 indicate which bits are to be changed, e.g. "1" may stand for a change. The value to be entered is included in manipulation data buffer 32. Once an entry of the mask buffer 34 and of the manipulation data buffer 32 has been processed, the system switches to the next data item.

In order to spare FPGA resources, the copy table 44 is extended by an extended bit 54 which indicates that a respective byte should be used for the app functions. In other words, only if the extended bit 54 is set, for example, the data are written into the instruction execution buffer 36 and the data from manipulation data buffer 32 and mask buffer 34 are processed by the data manipulation means 20.

In the exemplary embodiment of FIG. 2, the data manipulation means 20 manipulates data only in the forward direction. Data in the backward direction can be manipulated by the instruction execution means 30 in this example, by writing data into the input data buffer 24.

Referring to FIG. 3, an exemplary copy table 44 is shown, which defines a rearranging sequence, for example in order to rearrange data which are provided in a first data array 46, to form a second data array 48. The first data array 46 may, for example, be related to the first bus system 10, while the second data array 48 may be related to the second bus system 14.

Addresses 50 can be used to address each of the memory areas 52 of copy table 44. The memory areas 52 of copy table 44 are intended to receive addresses relating to addresses 56 of the first data array 46. Thus, the data 58 of first data array 46 can be output in a sequence 60 as data 62, for example.

In the present example, copy table 44 moreover includes an extended bit 54 which indicates whether a data item of the first data array is to be modified, for example. If the extended bit is set, i.e. if it has the value "1", the corresponding data item 58 can be modified before it is output. In the illustrated example, the data items "Data 2 Device 1", "Data 2 Device 2", and "Data 2 Device 3" of the first data array 46 are modified into data items "Data' 2 Device 1", "Data' 2 Device 2", and "Data' 2 Device 3" of the second data array 48.

In this way it is also possible to implement such functions like counter functions, reflex functions (different input states lead to a specific output state), time stamping or oversampling of process data with data from standard fieldbus modules, event evaluation, control functions, etc. The copy table which may for instance be stored in a RAM memory may moreover include further information. For example, further extended bits may be provided. The extended bits may for instance relate to the type of data and may indicate the size of the respective data item. The information may furthermore indicate the byte position in a lower-level fieldbus object, for example.

The aforementioned data may as well be further processed in parallel by the transfer means, for example. The copy table may be adapted such that different information can be derived with only a single memory access, for example. The access to the copy table begins at address 0x0, for example, and is subsequently incremented.

The copy table may also relate to additional memories which are provided for storing additional data and which include management data or status information, for example. The data manipulation means may then be adapted to link the forward-directed and/or backward-directed data with the additional data so as to obtain linked data and to supply the linked data to the respective bus system.

For example, it is possible that for each device of a lower-level bus system a management buffer is initialized with management bytes, and the copy table is then initialized with addresses related thereto.

The invention claimed is:

1. A device that couples a first bus system to a second bus system configured to provide bidirectional communication between the first bus system and the second bus system, the device comprising:
   data transfer means for transmitting forward-directed data from the first bus system to the second bus system and for transmitting backward-directed data from the second bus system to the first bus system;
   data manipulation means for manipulating forward-directed data and/or backward-directed data;
   an instruction memory that stores manipulation instructions that have been loaded therein, the manipulating instructions relating to manipulation of data by said data manipulation means, wherein the manipulation instructions are reloadable into the instruction memory;
   instruction execution means for executing the manipulation instructions and generating manipulation data; and
   a manipulation data buffer that buffers generated manipulation data for the data manipulation means;
   wherein the data manipulation means is configured to link the manipulation data buffered in the manipulation data buffer with forward-directed and/or backward-directed data.

2. The device that couples the first bus system to the second bus system according to claim 1,
   wherein the data manipulation means is further configured to overwrite at least portions of forward-directed and/or backward-directed data with manipulation data.

3. The device that couples the first bus system to the second bus system according to claim 2, wherein the manipulation instructions relate to forward-directed and/or backward-directed data, and
   wherein the instruction execution means is adapted to access at least one of forward-directed and/or backward-directed data in order to execute the manipulation instructions relating to these data.

4. The device that couples the first bus system to the second bus system according to claim 3, further comprising:
   an output data buffer associated with the first bus system that buffers forward-directed data; and
   an input data buffer associated with the first bus system that buffers backward-directed data,
   wherein the data transfer means and/or the data manipulation means are configured to access the output buffer and/or the input buffer to transmit or manipulate forward-directed and/or backward-directed data.

5. The device that couples the first bus system to the second bus system according to claim 4, wherein the instruction execution means is configured to access the output buffer and/or the input buffer in order to execute manipulation instructions relating to forward-directed data, or in order to feed manipulation data into the input buffer.

6. The device that couples the first bus system according to claim 5, wherein the data manipulation means is configured to
   link manipulation data with forward-directed or backward-directed data in such a manner that these manipulation data are initially transferred by the second or first bus system without being processed, and
   at a later time, return as manipulated backward-directed or forward-directed data for the first or second bus system, respectively.

7. The device that couples the first bus system according to claim 6, further comprising a copy table that provides a rearranging sequence for forward-directed and/or backward-directed data, and/or
   wherein the transfer means is configured to rearrange, according to the rearranging sequence, forward-directed data from the output data buffer, and to transmit them to the second bus system, and/or
   wherein the transfer means is adapted to rearrange, according to the rearranging sequence, backward-directed data and to transmit them to the first bus system to the input data buffer, and/or
   wherein the copy table comprises extended information comprising an extended bit which indicates whether a respective data item is to be manipulated by the data manipulation means.

8. The device that couples the first bus system according to claim 7, further comprising an instruction execution buffer that buffers data to be manipulated according to an extended bit.

9. The device that couples the first bus system according to claim 8, wherein the instruction execution means is configured to access the instruction execution buffer.

10. The device that couples the first bus system according to claim 9, wherein the instruction execution means processes the copy table after a cycle of the first and/or second bus system has been completed.

11. The device that couples the first bus system according to claim 10, comprising a mask buffer for storing a bit mask which indicates which portions of forward-directed and/or backward-directed data are to be manipulated by the data manipulation means.

12. The device that couples the first bus system according to claim 11, further comprising a processor configured to:
   initialize the instruction memory with the manipulation instructions, and/or
   to initialize the copy table with the rearranging sequence and with extended information if the copy table includes extended information.

13. A method that couples a first bus system to a second bus system configured to provide bidirectional communication between the first bus system and the second bus system, the method comprising:
   providing an instruction memory that stores manipulation instructions that have been loaded therein;
   reloading the manipulation instructions into the instruction memory;
   storing the manipulation instructions in the instruction memory;
   transferring data between the first and second bus systems, by data transfer means;
   executing the manipulation instructions and generating manipulation data;
   manipulating data according to said manipulation instructions, by data manipulation means, wherein the manipulation data is linked with forward-directed and/or backward-directed data.

14. A device equipped with a program, comprising a computer program for carrying out the method as claimed in claim 13.

15. A computer program comprising a non-transitory computer readable medium storing program code, which when executed on a computer, causes the computer to execute the method as claimed in claim 13.

* * * * *